US012644566B2

(12) United States Patent
Tai et al.

(10) Patent No.: US 12,644,566 B2
(45) Date of Patent: Jun. 2, 2026

(54) GAS STORAGE STRUCTURE AND GAS STORAGE DEVICE

(71) Applicant: Aura Material Inc., Hsinchu County (TW)

(72) Inventors: Chin-Chih Tai, Hsinchu County (TW); Hsin Hung Pan, Yilan County (TW); Fang Ching Chang, Tainan City (TW)

(73) Assignee: Aura Material Inc., Hsinchu County (TW)

( * ) Notice: Subject to any disclaimer, the term of this patent is extended or adjusted under 35 U.S.C. 154(b) by 314 days.

(21) Appl. No.: 18/612,848

(22) Filed: Mar. 21, 2024

(65) Prior Publication Data

US 2024/0318787 A1 Sep. 26, 2024

(30) Foreign Application Priority Data

Mar. 24, 2023 (TW) .................................. 112111121

(51) Int. Cl.
*F17C 11/00* (2006.01)

(52) U.S. Cl.
CPC ..... *F17C 11/005* (2013.01); *F17C 2201/0119* (2013.01); *F17C 2205/0323* (2013.01); *F17C 2221/012* (2013.01); *F17C 2260/025* (2013.01)

(58) Field of Classification Search
CPC ....................... F17C 11/005; F17C 2201/0119
See application file for complete search history.

(56) References Cited

U.S. PATENT DOCUMENTS

2021/0293383 A1* 9/2021 Levy ......................... F17C 1/12

FOREIGN PATENT DOCUMENTS

| | | | |
|---|---|---|---|
| CN | 109972010 | B | 11/2020 |
| CN | 112113132 | A | 12/2020 |
| CN | 114046443 | A | 2/2022 |
| CN | 114427657 | A | 5/2022 |
| JP | S63-147801 | A | 6/1988 |
| JP | 2003-222297 | A | 8/2003 |
| JP | 2008-150657 | A | 7/2008 |
| JP | 2008-538321 | A | 10/2008 |
| JP | 2012-193821 | A | 10/2012 |
| JP | 2017-207097 | A | 11/2017 |
| KR | 2017-0119383 | A | 10/2017 |
| TW | 201126091 | A | 8/2011 |
| WO | 2022/234800 | A1 | 11/2022 |

* cited by examiner

*Primary Examiner* — Kevin Joyner
(74) *Attorney, Agent, or Firm* — CKC & Partners Co., LLC

(57) ABSTRACT

A gas storage structure includes at least one tubular element. The at least one tubular element includes at least one channel and at least two gas storage layers. The at least two gas storage layers surround the at least one channel, wherein each of the at least two gas storage layers includes a plurality of pores, the at least two gas storage layers have different numbers of the plurality of pores per unit volume thereof, and sizes of the plurality of pores are different. Each of the at least two gas storage layers includes a plurality of crystallites, the plurality of pores are formed by the plurality of crystallites connected there among, and the plurality of pores are radially distributed from the at least one channel of the at least one tubular element to a peripheral area thereof.

12 Claims, 11 Drawing Sheets

GAS STORAGE STRUCTURE AND GAS STORAGE DEVICE

RELATED APPLICATIONS

This application claims priority to Taiwan Application Serial Number 112111121, filed Mar. 24, 2023, which is herein incorporated by reference.

BACKGROUND

Technical Field

The present disclosure relates to a gas storage structure and a gas storage device. More particularly, the present disclosure relates to a gas storage structure that is tubular and has at least two gas storage layers and a gas storage device including the aforementioned gas storage structure.

Description of Related Art

In modern society, energy has become an indispensable resource in human activities, and fossil fuels play a dominant role in supplying humanity's energy needs. In recent years, as the issues of energy shortage and global climate change have gradually received attention, it is urgent to find a renewable green energy. Because a calorific value of hydrogen is about 120 MJ/kg, a combustion product of the hydrogen is water, and the hydrogen is suitable for large-capacity and long-term energy storage, so the hydrogen has excellent application prospects in transportation fields such as trucks, trains, and ships. Hence, the hydrogen energy is regarded as a renewable energy source with a great development potential in the 21st century.

The storage of the hydrogen is essential to the application of the hydrogen energy. Conventional hydrogen storage technologies include a high-pressure gaseous hydrogen storage method, a low-temperature liquid hydrogen storage method, a solid-state hydrogen storage method, etc., wherein the solid-state hydrogen storage method is relatively safe and convenient and has the ability to purify the hydrogen, so the solid-state hydrogen storage method has become an important research aim in the hydrogen storage technologies.

Currently, the structural patterns of solid hydrogen storage materials on the market include powder, granular and tablet, wherein a granular hydrogen storage structure is formed by adding a binder to connect the crystallites thereof tightly, and a tablet-shaped hydrogen storage structure is formed by tightly compacting the crystallites thereof. Although both the granular hydrogen storage structure and the tablet-shaped hydrogen storage structure can increase a hydrogen storage capacity per unit volume, a surface of the crystallites of the granular hydrogen storage structure is covered with the binder, and the space between the crystallites of the tablet-shaped hydrogen storage structure is reduced, so that the diffusions of hydrogen molecules into internal lattices of the crystallites of the granular hydrogen storage structure and the tablet-shaped hydrogen storage structure are hindered. Hence, the filling times of both the granular hydrogen storage structure and the tablet-shaped hydrogen storage structure are increased, and the problems of reduced efficiency in hydrogen releasing and structure ageing, as well as the pulverization of the crystallites due to the increased cycling of uses may have occurred, resulting in reducing the efficiency of the hydrogen storage.

In order to improve the efficiency of filling hydrogen into the granular hydrogen storage structure or into the tablet-shaped hydrogen storage structure, the high-pressure method is used in the conventional technology. For example, the hydrogen molecules are forced to diffuse into the crystallites under a pressure of 200 $kg/cm^2$, so that the hydrogen adsorbing and storing rate of the crystallites can be accelerated, and the gas filling time of the granular hydrogen storage structure or the tablet-shaped hydrogen storage structure can be reduced. However, the granular hydrogen storage structure and the tablet-shaped hydrogen storage structure still have the disadvantages of the lower hydrogen release efficiency and the reduction of the hydrogen storage efficiency caused by the increase in the number of uses.

Therefore, under the premises of excellent gas storage capacity and without increasing the filling pressure, how to provide a gas storage structure that can reduce the gas filling time, increase the gas-releasing rate, improve the stability of the gas storage structure, and increase the service life of the gas storage device is a technical subject of commercial value.

SUMMARY

According to one aspect of the present disclosure, a gas storage structure includes at least one tubular element. The at least one tubular element includes at least one channel and at least two gas storage layers. The at least two gas storage layers surround the at least one channel, wherein each of the at least two gas storage layers includes a plurality of pores, the at least two gas storage layers have different numbers of the plurality of pores per unit volume thereof, and sizes of the plurality of pores are different. Each of the at least two gas storage layers includes a plurality of crystallites, the plurality of pores are formed by the plurality of crystallites connected there among, and the plurality of pores are radially distributed from the at least one channel of the at least one tubular element to a peripheral area thereof.

According to another aspect of the present disclosure, a gas storage device includes a main body, the gas storage structure according to the aforementioned aspect and an air valve element. The main body includes a gas port and an accommodating space, wherein the gas port is communicated with the accommodating space. The gas storage structure is disposed in the accommodating space. The air valve element is disposed on the main body and is communicated with the gas port, and the air valve element is communicated with the accommodating space and an external space of the main body. A maximum diameter of the gas port is parallel to a maximum diameter of the at least one tubular element. When the air valve element is opened, the at least one channel of the gas storage structure is communicated with the external space of the main body, and a gas is stored in or released from the gas storage device.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
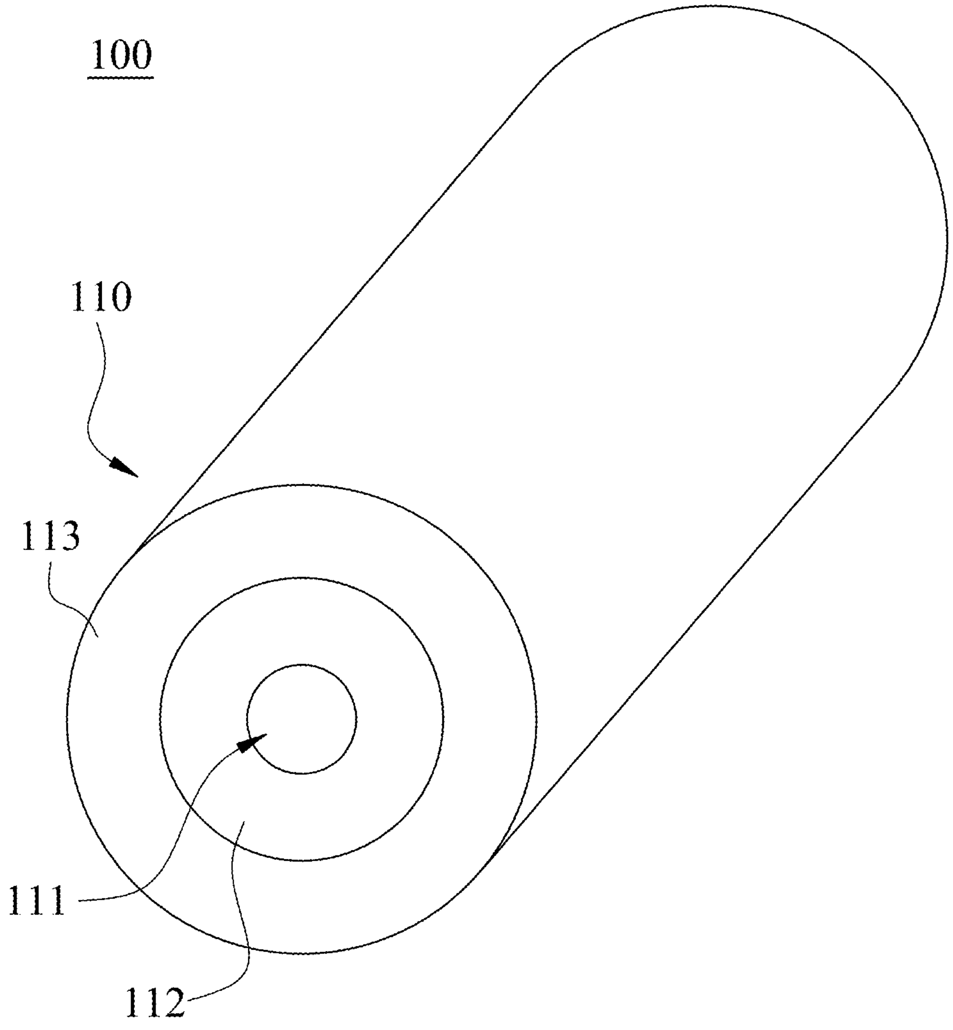
FIG. 1 is a schematic view of a gas storage structure according to one example of one embodiment of the present disclosure.

The present disclosure will be further exemplified by the following specific embodiments. However, the embodiments can be applied to various inventive concepts and can be embodied in multiple specific ranges. The specific embodiments are only for the purposes of description and are not limited to these practical details thereof. Furthermore, in order to simplify the drawings, some conventional structures and elements will be illustrated in the drawings simply and schematically. The duplicated elements may be denoted by the same or similar numbers.

[Gas Storage Structure of the Present Disclosure]

Figure 2:
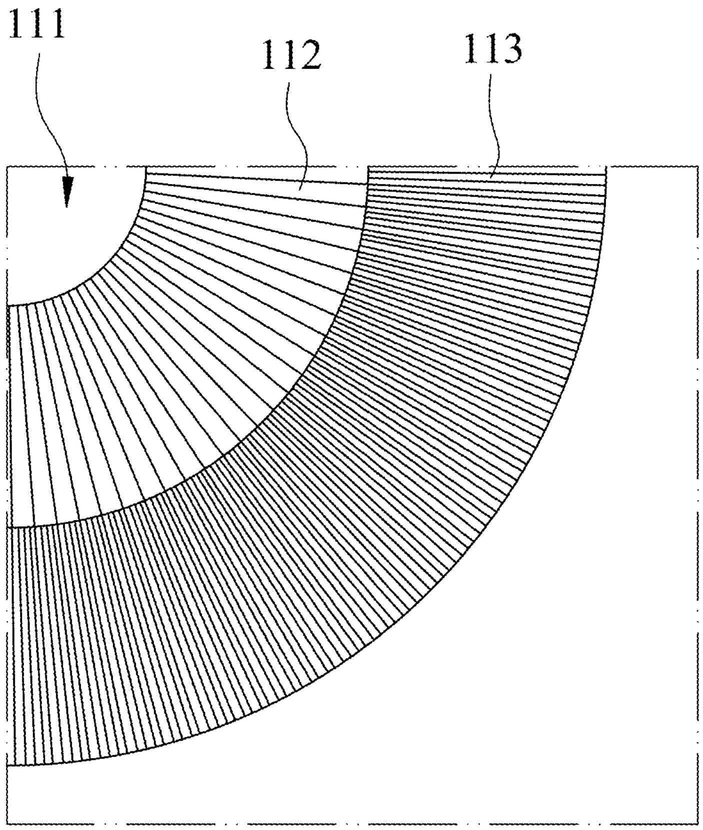
FIG. 2 is a partial enlarged view of the gas storage structure of FIG. 1.

Reference is made to FIG. 1 and FIG. 2. FIG. 1 is a schematic view of a gas storage structure 100 according to one example of one embodiment of the present disclosure. FIG. 2 is a partial enlarged view of the gas storage structure 100 of FIG. 1. The gas storage structure 100 includes at least one tubular element 110.

The tubular element 110 includes at least one channel 111 and at least two gas storage layers. The two gas storage layers surround the channel 111, wherein each of the gas storage layers includes a plurality of pores (not shown), the two gas storage layers have different numbers of the pores per unit volume thereof, and sizes of the pores are different.

Specifically, in the example of FIG. 1, the two gas storage layers include a first gas storage layer 112 and a second gas storage layer 113, and the first gas storage layer 112 and the second gas storage layer 113 are sequentially connected and concentrically disposed from the channel 111 of the tubular element 110 to a peripheral area thereof (reference number is omitted).

Further, although it is not shown in the figures, in the gas storage structure 100, each of the gas storage layers includes a plurality of crystallites, each of the gas storage layers is stacked by the plurality of crystallites, and the plurality of pores are formed by the plurality of crystallites connected there among. As shown in FIG. 2, the first gas storage layer 112 and the second gas storage layer 113 are presented as radial structures extending from the channel 111 in the center of the tubular element 110 to the peripheral area thereof in appearance, and the plurality of pores of the first gas storage layer 112 and the second gas storage layer 113 are radially distributed from the channel 111 of the tubular element 110 to the peripheral area thereof. Further, the details of the crystallites and the pores of the gas storage layers of the present disclosure are further described in the following paragraphs with the examples.

Therefore, by the arrangement that the gas storage structure 100 includes at least one tubular element 110, the gas storage structure 100 of the present disclosure can have a larger specific surface area, and a gas filling speed of the gas storage structure 100 can be increased. Further, by the arrangement that the plurality of pores are radially distributed from the at least one channel 111 of the tubular element 110 to the peripheral area thereof, the specific surface area of the gas storage structure 100 can be further increased, and thus a gas can be directly guided to a surface of the crystallites in the gas storage layers. Hence, a mass transfer resistance of the gas can be reduced, and a gas adsorption rate of the plurality of crystallites and a gas storage rate thereof can be increased, so that a gas filling time of the gas storage structure 100 of the present disclosure can be reduced by at least 20% compared to that of a commercial granular hydrogen storage structure or a commercial tablet-shaped hydrogen storage structure. Furthermore, the commercial granular hydrogen storage structure is formed by adding a binder to connect crystallites thereof tightly, and the commercial tablet-shaped hydrogen storage structure is formed by tightly compacting crystallites thereof.

In the gas storage structure 100 of the present disclosure, each of the sizes of the pores can be 0.1 μm to 500 μm. Therefore, the gas can more easily diffuse throughout the gas storage structure 100 when the gas storage structure 100 maintains a required toughness, but the present disclosure is not limited thereto.

In the gas storage structure 100 of the present disclosure, a density of the first gas storage layer 112 can be smaller than or greater than a density of the second gas storage layer 113. The density presents a mass per unit volume. As shown in FIG. 2, when the density of the first gas storage layer 112 is smaller than the density of the second gas storage layer 113, an average of the sizes of the plurality of pores of the first gas storage layer 112 can be 100 μm to 200 μm, so that the first gas storage layer 112 has the characteristics of storing gas and increasing the gas diffusion rate. Further, an average of the sizes of the plurality of pores of the second gas storage layer 113 can be 0.1 μm to 100 μm, so that the second gas storage layer 113 has a gas storage space with a high capacity. Therefore, by the arrangements that the pores of the first gas storage layer 112 and the pores of the second gas storage layer 113 are radially distributed, and the density of the first gas storage layer 112 and the density of the second gas storage layer 113 are different, when the gas is released from the gas storage structure 100 of the present disclosure, the gas can be guided from the second gas storage layer 113 with a higher density to the first gas storage layer 112 with a lower density and the channel 111 by the radial distribution of the pores. Therefore, a gas-releasing rate of the gas storage structure 100 can be greater than or equal to 80%, and the gas storage structure 100 of the present disclosure has excellent potential applications in relevant markets. Further, although it is not shown in the figures, in other embodiments, the density of the first gas storage layer can also be greater than the density of the second gas storage layer to meet the different gas storage requirements, but the present disclosure is not limited thereto.

In the gas storage structure 100 of the present disclosure, a particle size of each of the crystallites can be 0.5 μm to 100 μm. Therefore, a better strength and a better toughness of the gas storage structure 100 can be provided. Further, a material of each of the crystallites can be selected according to the storage requirements. In particular, the material of each of the crystallites can include a carbon group material, a boron group material, a nitrogen group material, a zeolite material, a metal-organic framework material, a metal oxide material, a silica gel, an aerogel, a lithium molecular sieve, an activated carbon, a covalent organic framework material, a bentonite, a mordenite or a sepiolite. Furthermore, the material of each of the crystallites can be selected from a group consisting of an AB alloy, an $AB_2$ alloy, an $AB_3$ alloy, an $AB_5$ alloy, an $A_2B$ alloy, an $A_2B_7$ alloy, an $A_6B_{23}$ alloy, a solid solution and a magnesium-based alloy, wherein A is an exothermic metal, and B is an endothermic metal. Moreover, the material of each of the crystallites can be selected from a group consisting of a silver, a copper, a carbon, a titanium, a nickel, an iron, a cobalt, a vanadium, a platinum, a palladium, a chromium, a gold, a lanthanum and a cerium. In other words, the material of each of the crystallites can be any one of the aforementioned materials or a combination thereof, but the present disclosure is not limited thereto.

Further, when the particle size of each of the crystallites satisfies the aforementioned range, and the material of each of the crystallites is a single one of the aforementioned materials or the combination thereof, each of the crystallites can repeatedly adsorb and release a target gas due to changes of a temperature, a pressure or other environmental factors by the arrangement that the plurality of crystallites are mutually stacked and exposed to the target gas. Therefore, each of the crystallites can repeatedly transform between two different phases along with the absorption and release of energy. Further, a crystal nucleus can be formed on the surface of each of the crystallites after adsorbing and releasing the target gas multiple times, so that the contact surfaces between the crystallites are connected together due to the phase changes and the nucleation phenomena, and then the space which is not occupied by the crystallites can further form the plurality of pores.

For example, when the material of each of the crystallites is the $AB_5$ alloy and the target gas is the hydrogen, each of the crystallites is in a metallic phase before adsorbing the hydrogen. During the hydrogen adsorption process of each of the crystallites, the hydrogen molecules are decomposed into hydrogen atoms, and the hydrogen atoms fill the lattice coordination sites inside each of the crystallites. At the same time, each of the crystallites is transformed from the metallic phase to a metal hydride phase. Further, the contact surfaces between the plurality of crystallites are connected together by the nucleation phenomena after multiple and repeated phase changes. Furthermore, the details of the radial distribution of the plurality of pores of the present disclosure will be further described with examples in the following paragraphs.

The gas storage structure 100 of the present disclosure can be manufactured by an extrusion molding method, an injection molding method or an additive manufacturing method, but the present disclosure is not limited thereto.

[Gas Storage Device of the Present Disclosure]

Figure 3:
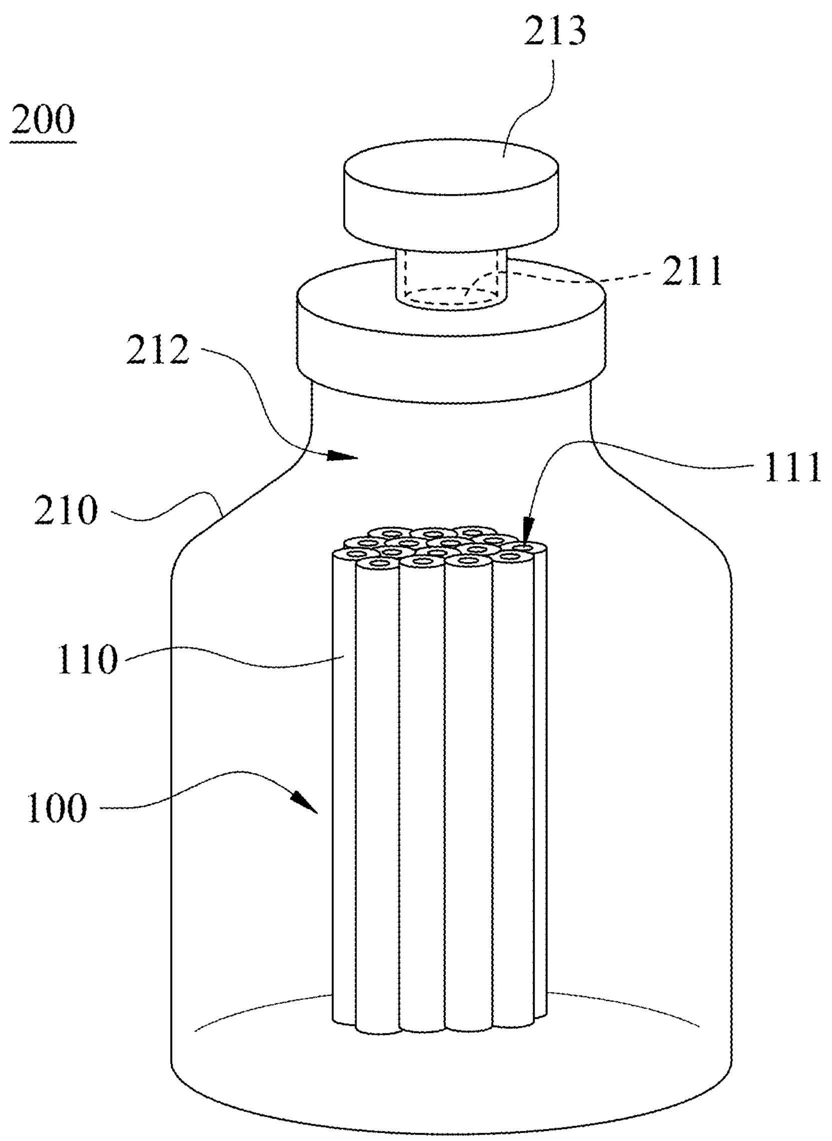
FIG. 3 is a schematic view of a gas storage device according to one example of another embodiment of the present disclosure.

Reference is made to FIG. 3. FIG. 3 is a schematic view of a gas storage device 200 according to one example of another embodiment of the present disclosure. The gas storage device 200 includes a main body 210, a gas storage structure 100 and an air valve element 213.

The main body 210 includes a gas port 211 and an accommodating space 212, wherein the gas port 211 is communicated with the accommodating space 212.

The gas storage structure 100 is disposed in the accommodating space 212 and includes at least one tubular element 110. In the example of FIG. 3, the gas storage structure 100 includes a plurality of tubular elements 110, and the gas storage structure 100 can be the gas storage structure 100 of FIG. 1, so that the details of the same elements are not described herein.

The air valve element 213 is disposed on the main body 210 and is communicated with the gas port 211, and the air valve element 213 is communicated with the accommodating space 212 and an external space of the main body 210. Further, the air valve element 213 can be a device on the market that controls the gas in and out, but the present disclosure is not limited thereto.

Particularly, in the gas storage device 200, the gas port 211 has a maximum diameter, and the maximum diameter of the gas port 211 is parallel to a maximum diameter of the at least one tubular element 110 of the gas storage structure 100. Therefore, by the arrangement that the maximum diameter of the gas port 211 is parallel to the maximum diameter of the tubular element 110, the gas port 211 can be effectively communicated with the tubular element 110 of the gas storage structure 100. When the air valve element 213 is opened, the accommodating space 212 is communicated with the external space of the main body 210. At the same time, the channel 111 of the tubular element 110 of the gas storage structure 100 is communicated with the external space of the main body 210 through the accommodating space 212, and a gas can be stored in or released from the gas storage device 200 by controlling the air valve element 213.

Figure 4:
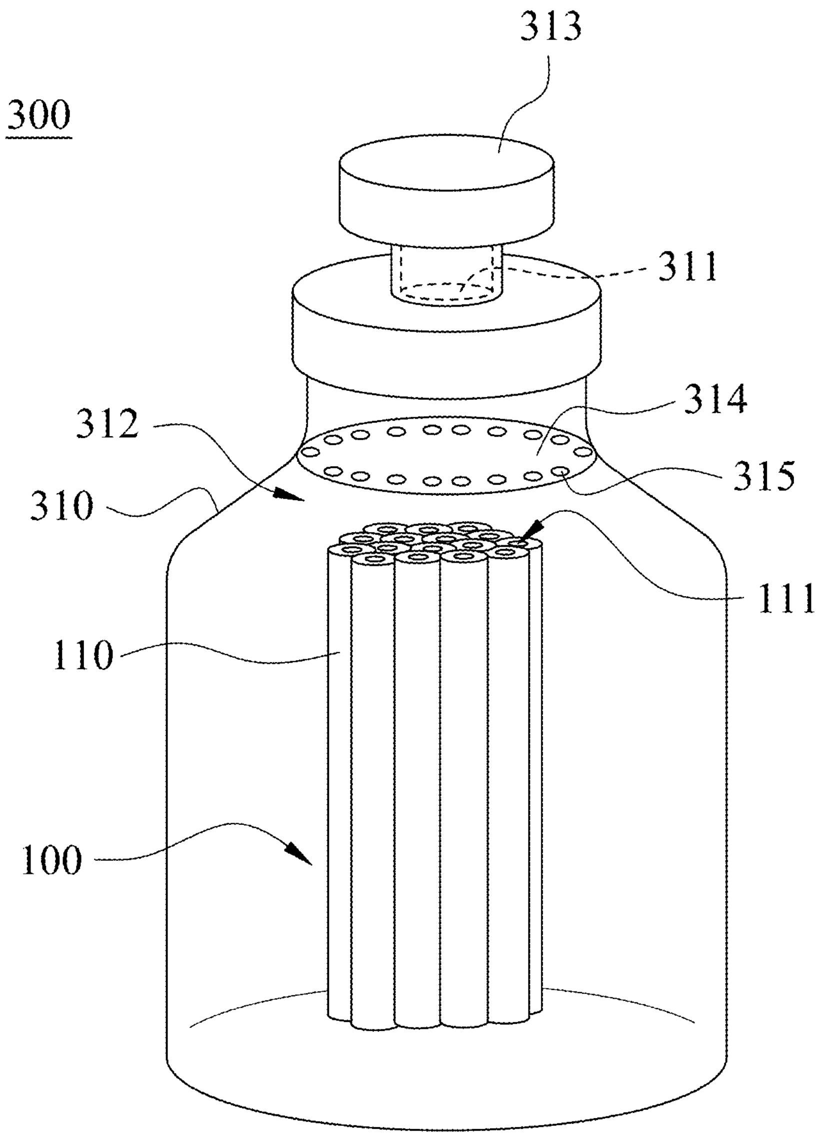
FIG. 4 is a schematic view of a gas storage device according to another example of another embodiment of the present disclosure.

Reference is made to FIG. 4. FIG. 4 is a schematic view of a gas storage device 300 according to another example of another embodiment of the present disclosure. The gas storage device 300 includes a main body 310, a gas storage structure 100 and an air valve element 313.

The main body 310 includes a gas port 311, an accommodating space 312 and a gas guiding structure 314. The gas port 311 is communicated with the accommodating space 312. The gas guiding structure 314 is disposed in the accommodating space 312, wherein the gas guiding structure 314 is disposed between the air valve element 313 and the gas storage structure 100, and the gas guiding structure 314 includes a plurality of gas guiding holes 315. Further, the main body 310 and the air valve element 313 are structurally the same as the main body 210 and the air valve element 213 of FIG. 3, and the gas storage structure 100 can be the gas storage structure 100 of FIG. 1, so that the details of the same elements are not described herein.

Specifically, in the gas storage device 300, each of the gas guiding holes 315 of the gas guiding structure 314 has a maximum diameter, and the maximum diameter of each of the gas guiding holes 315 is parallel to the maximum diameter of the at least one tubular element 110 of the gas storage structure 100. Therefore, the gas guiding holes 315 can be effectively communicated with the channel 111 of the tubular element 110. When the air valve element 313 is opened, the accommodating space 312 is communicated with an external space of the main body 310. At the same time, the channel 111 of the tubular element 110 of the gas storage structure 100 is communicated with the external space of the main body 310 through the accommodating space 312 and the gas guiding structure 314. Further, the gas guiding structure 314 can be used to control an inflation speed or a deflation speed of the gas storage device 300 according to the different sizes of the gas guiding holes 315.

Therefore, by the arrangements that the gas storage device 200 and the gas storage device 300 of the present disclosure include the gas storage structure 100, the effects of rapidly storing and releasing the gas can be effectively achieved, and the gas storage device 200 and gas storage device 300 of the present disclosure have excellent potential applications in relevant markets.

Examples and Comparative Examples

The details of the gas storage structure of the present disclosure and the gas storage effect thereof are described below with Example 1 and Example 2 of the present disclosure.

Figure 5A:
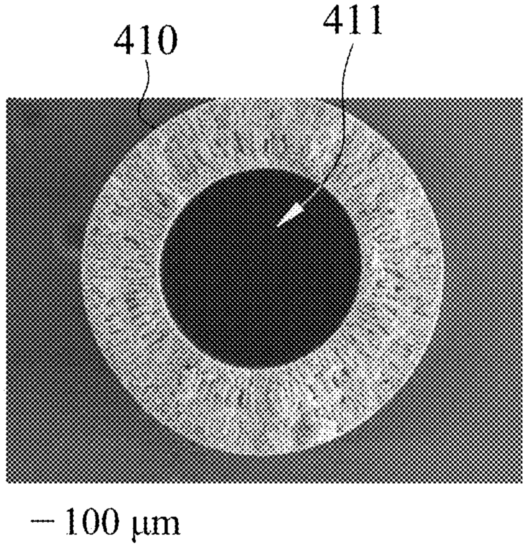
FIG. 5A shows an image of a tubular element of a gas storage structure of Example 1 of the present disclosure.
Figure 5B:
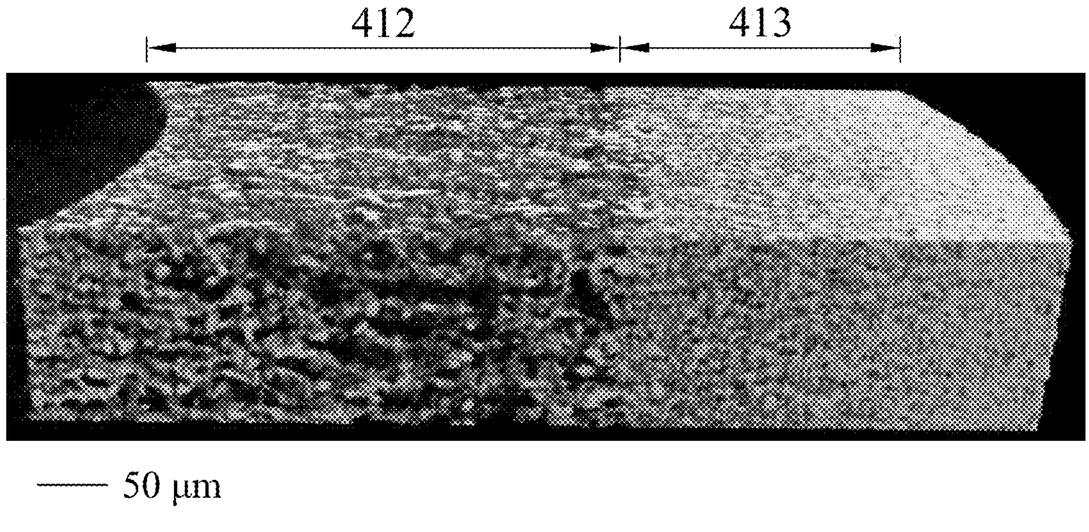
FIG. 5B shows a partial cross-sectional image of the gas storage structure of FIG. 5A.

Reference is made to FIG. 5A and FIG. 5B. FIG. 5A shows an image of a tubular element 410 of a gas storage structure of Example 1 of the present disclosure. FIG. 5B shows a partial cross-sectional image of the gas storage structure of FIG. 5A.

The tubular element 410 includes a channel 411, a first gas storage layer 412 and a second gas storage layer 413, wherein the first gas storage layer 412 and the second gas storage layer 413 are sequentially connected and concentrically disposed from the channel 411 of the tubular element 410 to a peripheral area thereof, and a density of the first gas storage layer 412 and a density of the second gas storage layer 413 are different. The density presents a mass per unit volume. To be specific, as shown in FIG. 5A and FIG. 5B, when the plurality of crystallites of the first gas storage layer 412 and the plurality of crystallites of the second gas storage layer 413 are connected to each other by the phase changes and the nucleation phenomena, the spaces in the first gas storage layer 412 and the spaces in the second gas storage layer 413 that are not occupied by the plurality of crystallites will form a plurality of pores. As shown in FIG. 5B, the arrangement of the first gas storage layer 412 is relatively loose, and the arrangement of the second gas storage layer 413 is relatively dense, so that the density of the first gas storage layer 412 is smaller than the density of the second gas storage layer 413. Hence, the plurality of pores of the first gas storage layer 412 and the second gas storage layer 413 are radially distributed from the channel 411 of the tubular element 410 to the peripheral area thereof. Therefore, the first gas storage layer 412 can have excellent effects on the gas conduction and the gas storage, the gas diffusion rate can be increased, and the second gas storage layer 413 can have a gas storage space with a high capacity.

As further shown in FIG. 5B, the first gas storage layer 412 and the second gas storage layer 413 are sequentially connected and concentrically disposed, and there is a transitional gas storage layer (reference number is omitted) between the first gas storage layer 412 and the second gas storage layer 413. In detail, the sizes of the pores of the first gas storage layer 412 are larger than the sizes of the pores of the second gas storage layer 413, and the sizes of the pores gradually decrease from the first gas storage layer 412 to the second gas storage layer 413. Further, an average of the sizes of the plurality of pores of the first gas storage layer 412 can be 100 μm to 200 μm, an average of the sizes of the plurality of pores of the second gas storage layer 413 can be 0.1 μm to 100 μm, and an average of the sizes of a plurality of pores of the transitional gas storage layer can be 10 μm to 100 μm. Therefore, by the arrangement that the density of the first gas storage layer 412 and the density of the second gas storage layer 413 are different, the gas storage structure can be presented as a radial guide structure with an arrangement gradually arranged from loose to dense. Thus, the efficiency of filling gas or releasing gas can be enhanced, and the structural stability of the gas storage structure can be enhanced.

Figure 6A:
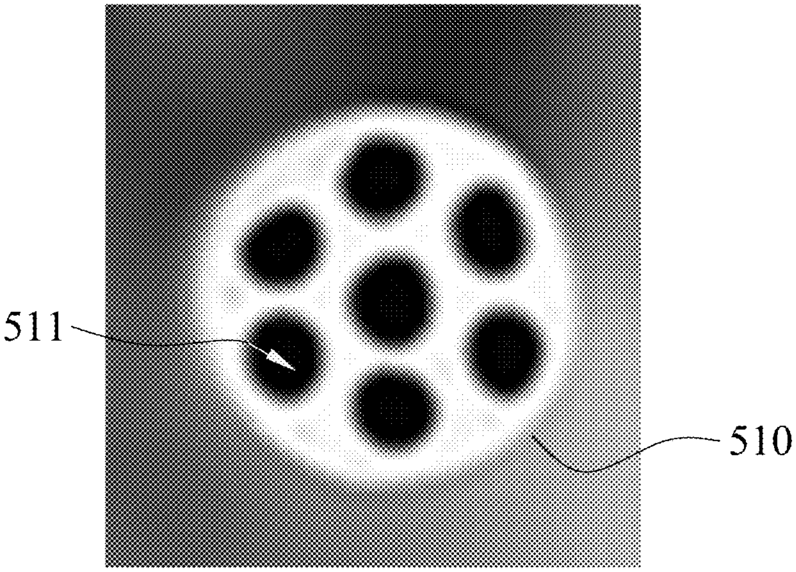
FIG. 6A shows an image of a tubular element of a gas storage structure of Example 2 of the present disclosure.
Figure 6B:
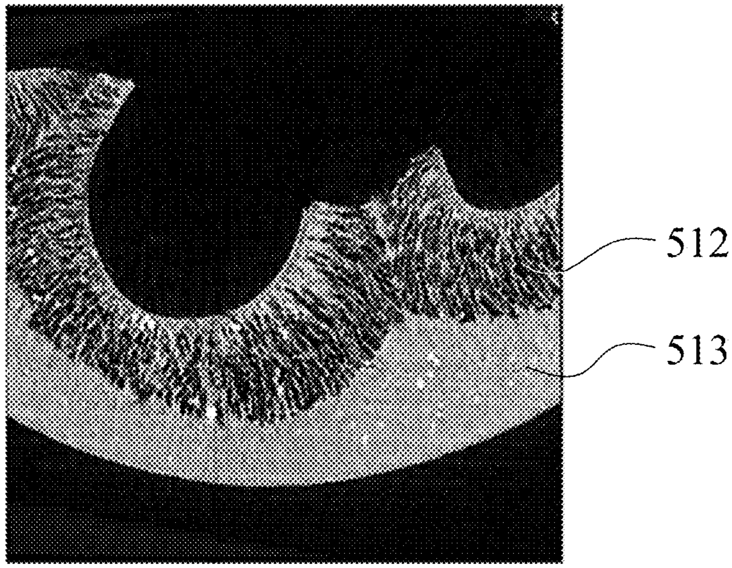
FIG. 6B shows a partially enlarged view of the gas storage structure of FIG. 6A.
Figure 6C:
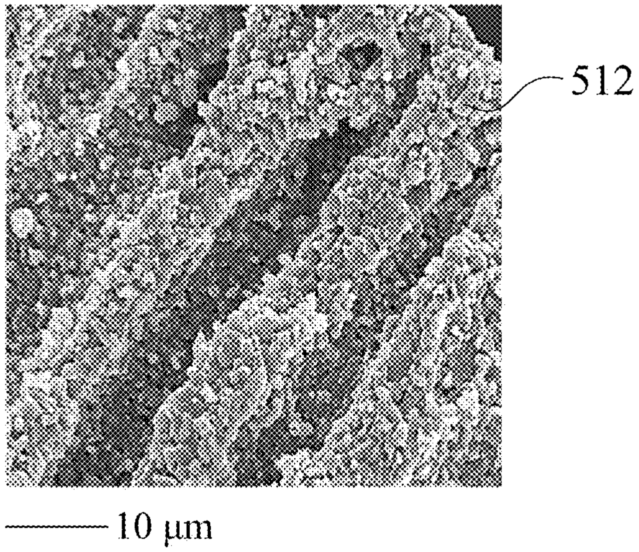
FIG. 6C shows an enlarged view of a first gas storage layer of FIG. 6B.
Figure 6D:
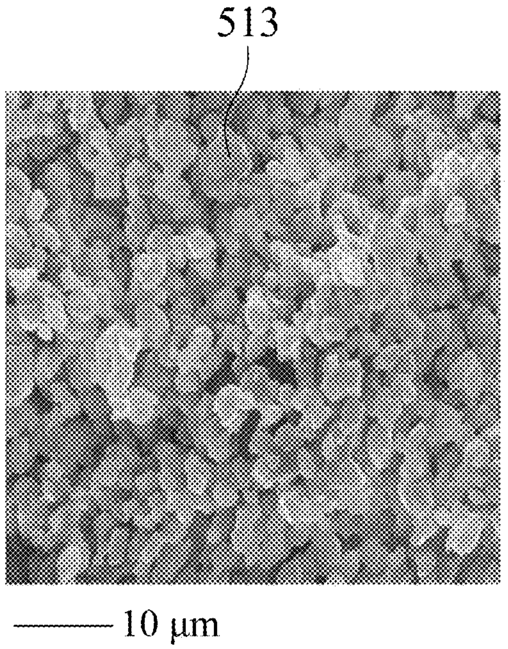
FIG. 6D shows an enlarged view of a second gas storage layer of FIG. 6B.

Reference is made to FIG. 6A to FIG. 6D. FIG. 6A shows an image of a tubular element 510 of a gas storage structure of Example 2 of the present disclosure. FIG. 6B shows a partially enlarged view of the gas storage structure of FIG. 6A. FIG. 6C shows an enlarged view of a first gas storage layer 512 of FIG. 6B. FIG. 6D shows an enlarged view of a second gas storage layer 513 of FIG. 6B.

As shown in FIG. 6A and FIG. 6B, the tubular element 510 includes seven channels 511, a first gas storage layer 512 and a second gas storage layer 513. In FIG. 6A, one of the channels 511 is disposed at a center of the tubular element 510, and the other six of the channels 511 surround the channel 511 disposed at the center, so that the channels 511 of the tubular element 510 are presented as a radial distribution in appearance. In FIG. 6B, the second gas storage layer 513 is disposed on a peripheral area of the tubular element 510 and surrounds the seven of the channels 511, and the first gas storage layer 512 surrounds each of the channels 511 and is covered by the second gas storage layer 513. Further, the first gas storage layer 512 and the second gas storage layer 513 are sequentially connected and concentrically or eccentrically disposed from each of the channels 511 of the tubular element 510 to the peripheral area thereof. Therefore, the gas storage structure of the present disclosure can have an excellent specific surface area by the arrangement that the tubular element 510 includes a plurality of channels 511, and it is favorable for increasing the gas filling speed of the gas storage structure.

As shown in FIG. 6C and FIG. 6D, the first gas storage layer 512 and the second gas storage layer 513 include a plurality of pores, wherein the number of the pores in the first gas storage layer 512 is larger and the shape thereof is slender compared to that of the pores of the second gas storage layer 513. Therefore, the first gas storage layer 512 has excellent effects on the gas conduction and the promotion of the gas diffusion. Further, cause by the arrangements that the size of the pores of the second gas storage layer 513 is smaller and the distribution of the pores is denser compared to that of the first gas storage layer 512, a gas storage space with a high capacity of the second gas storage layer 513 can be obtained.

Figure 7:
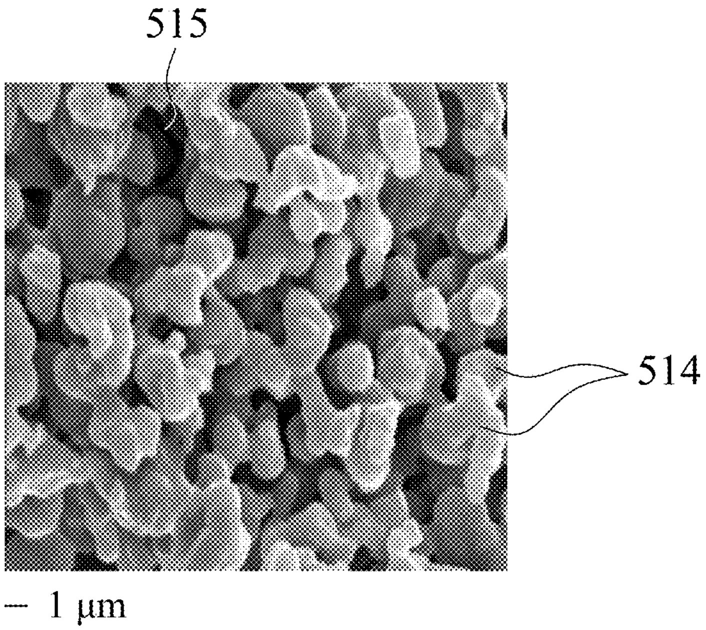
FIG. 7 shows an image of crystallites of the gas storage structure of Example 2.

Reference is made to FIG. 7. FIG. 7 shows an image of crystallites 514 of the gas storage structure of Example 2. Particularly, in the gas storage structure of Example 2, both the first gas storage layer 512 and the second gas storage layer 513 are formed by stacking a plurality of crystallites 514, wherein the crystallites 514 are connected by neck connection, and a plurality of pores 515 are formed by the spaces that are not occupied by the plurality of crystallites 514 of the first gas storage layer 512 and the second gas storage layer 513. In the gas storage structure of Example 2, a material of the crystallites 514 is the $AB_5$ alloy, so that the gas storage structure has the advantage of rapid gas filling; the filling of the gas can be achieved under a pressure of less than 20 kg/cm$^2$, and a gas storage with a high capacity can be obtained under a pressure of less than 10 kg/cm$^2$. In detail, during the storage and release of a target gas of the gas storage structure, the target gas enters the crystallites 514, and then the crystal lattice structures of the crystallites 514 are changed. At the same time, the temperature of the crystallites 514 is also changed. The lattice boundaries between the crystallites 514 of the gas storage structure become blurred after multiple times of storing and releasing the gas, but the integral granular structure of each of the crystallites 514 can still be maintained. Further, the pores 515 formed by the connection of the crystallites 514 do not collapse due to the phase change of the crystal lattice structures, and a state of thermodynamic equilibrium of the crystallites 514 can be further achieved, so that the overall structure of the gas storage structure can be more stable.

Figure 8:
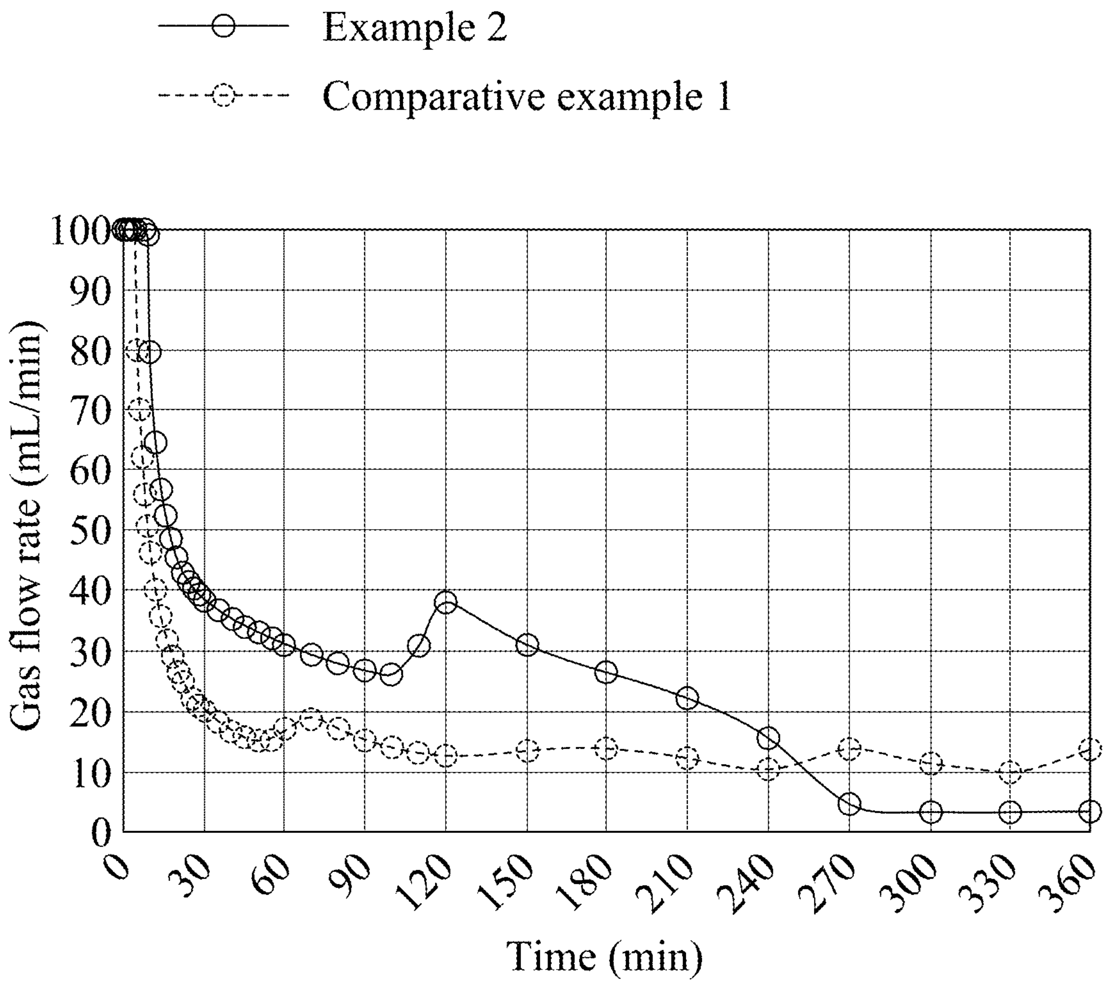
FIG. 8 shows the results of the gas-releasing test of the gas storage structure of Example 2 and the gas storage structure of Comparative example 1.

Reference is made to FIG. 8 and Table 1. FIG. 8 shows the results of the gas-releasing test of the gas storage structure of Example 2 and the gas storage structure of Comparative example 1, wherein the gas storage structure of Example 2 is the gas storage structure of FIG. 6A, so that the details of the same elements are not described herein. Table 1 shows the values of the gas storage capacity per unit structural weight, the gas filling time, the gas filling rate and the gas-releasing rate of the gas storage structure of Example 2 and the gas storage structure of Comparative example 1. Specifically, in Table 1, the gas storage capacity per unit structural weight is the weight of the target gas stored per unit structure weight at an ambient temperature of 10~20° C. and a filling pressure of 5 $kg/cm^2$. The gas filling time is the time required to fill the gas storage structure with the target gas at the ambient temperature of 10~20° C. The gas filling rate is the weight of the target gas increased per unit structure and per unit time at an ambient temperature of 20° C. and a filling pressure of 2 $kg/cm^2$. The gas-releasing rate is the weight of the target gas released from the gas storage structure at an ambient temperature of 40° C. and a continuous gas release for 6 hours. In detail, the target gas is the hydrogen ($H_2$) to further analyze the gas-releasing performance of the gas storage structure of Example 2 at different times. In the present experiment, Example 2 is the gas storage structure of the present disclosure, Comparative example 1 is a granular hydrogen storage structure, and a plurality of pores of the gas storage structure of Comparative example 1 are not radially distributed. Further, the gas-releasing rate in the present experiment is calculated based on a gas-releasing rate calculation formula, and the gas-releasing rate calculation formula is as follows:

Gas-releasing rate(%) =

(Total gas uptake weight of a gas storage structure (grams) − Residual gas uptake weight of the gas storage structure after test (grams))/(Total gas uptake weight of the gas storage structure (grams)) × 100%.

TABLE 1

| | Example 2 | Comparative example 1 |
|---|---|---|
| Gas storage capacity per unit structural weight (wt %) | 1~1.12 | 1~1.25 |
| Gas filling time (minutes) | ≤20 | 30~50 |
| Gas filling rate (Weight of the target gas/(weight of the gas storage structure before test × minutes)) | $5.7 \times 10^{-4}$ | $2.5 \times 10^{-4}$ |
| Gas-releasing rate (%) | 85.7 | 55.6 |

As shown in FIG. 8, the gas flow rate of the gas storage structure of Example 2 is higher than the gas flow rate of the gas storage structure of Comparative example 1 before 240 minutes. As shown in Table 1, the gas-releasing rate of the gas storage structure of Example 2 can reach 85.7%, and the gas-releasing rate of the gas storage structure of Comparative example 1 is only 55.6%. Further, the gas filling time of Example 2 is reduced by at least 20% compared to the gas filling time of Comparative example 1. Furthermore, the gas filling rate of Example 2 is increased by 55% compared to the gas filling rate of Comparative example 1. In detail, the gas storage structure of Comparative example 1 is the granular hydrogen storage structure, and the gas storage structure of Comparative example 1 is formed by adding a binder to connect crystallites thereof, so that a surface of the crystallites is covered with the binder. Although the hydrogen molecules can permeate and pass through an adhesive coating layer of the gas storage structure of Comparative example 1, a diffusion distance between the hydrogen molecule and the surface of the crystallites is increased by the adhesive coating layer, and the diffusing rates at which the crystallites adsorb and store hydrogen are affected. However, the gas storage structure of Example 2 has the arrangements that single one tubular element includes the plurality of channels, the densities of the two gas storage layers are different, and the plurality of pores are radially distributed from the channels of the tubular element to the peripheral area thereof, so that the gas storage structure of Example 2 has an excellent specific surface area. Hence, when the gas storage structure of Example 2 is filled with the hydrogen, the hydrogen molecules can rapidly diffuse to the surface of the crystallites of each of the gas storage layers by the radial distribution of the pores, and the mass transfer resistance of the hydrogen molecules can be effectively reduced. Further, the plurality of pores of the gas storage structure of Example 2 are formed by the plurality of crystallites connected there among, and the surface of the crystallites is not covered with the binder. Therefore, the diffusing rates at which crystallites adsorb and store hydrogen can be accelerated, and a stable storage state of the gas storage structure of Example 2 can be achieved after adsorbing hydrogen. It can be seen from the above results that the gas storage structure of the present disclosure can effectively reduce the gas filling time and increase the gas-releasing rate by the arrangements that the densities of the two gas storage layers are different and the radial distribution of the pores.

In other examples, the gas-releasing rate of the gas storage structure of the present disclosure can be greater than or equal to 56%. Further, the gas-releasing rate of the gas storage structure of the present disclosure can be greater than or equal to 60%. Furthermore, the gas-releasing rate of the gas storage structure of the present disclosure can be greater than or equal to 70%. Moreover, the gas-releasing rate of the gas storage structure of the present disclosure can be greater than or equal to 80%. Moreover, the gas-releasing rate of the gas storage structure of the present disclosure can be greater than or equal to 85%.

Figure 9:
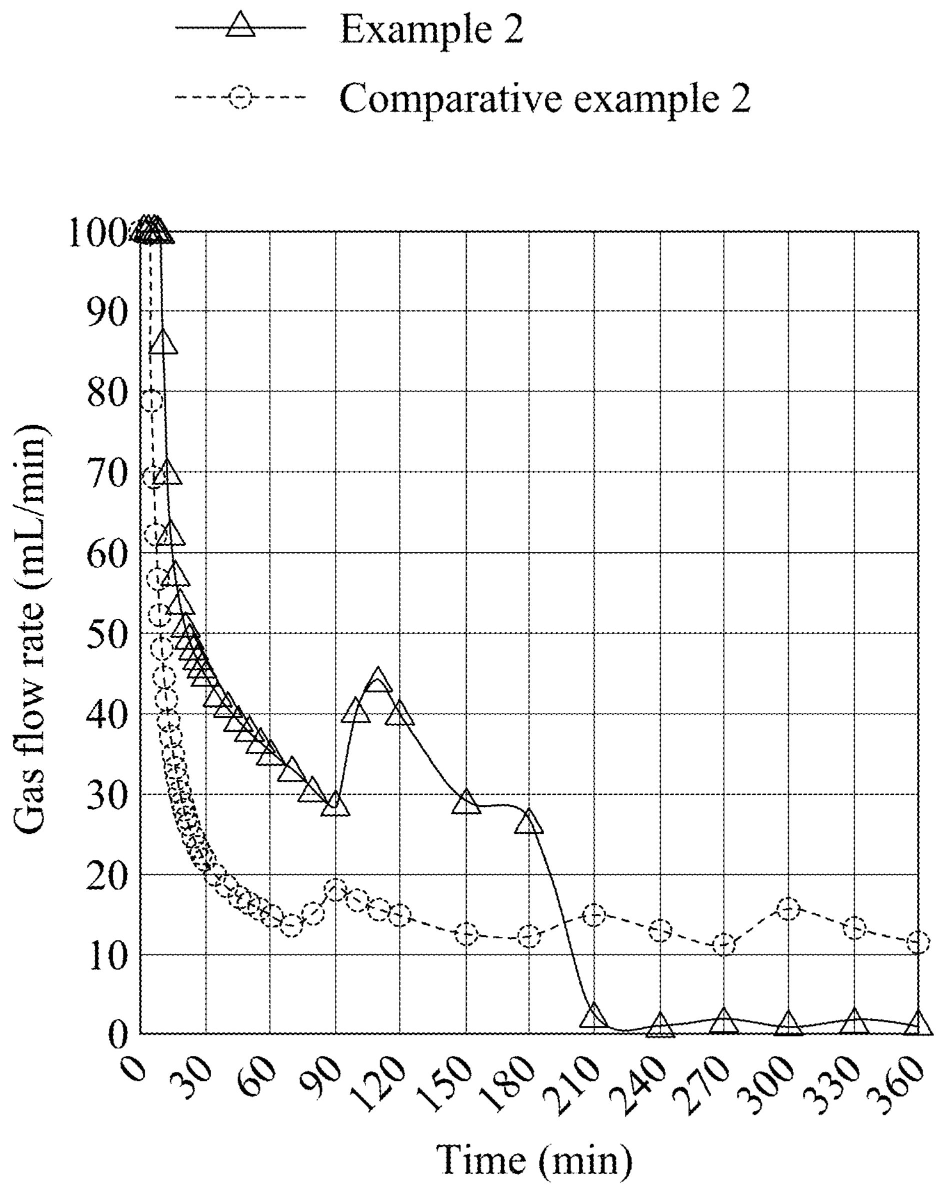
FIG. 9 shows the results of the gas-releasing test of the gas storage structure of Example 2 and the gas storage structure of Comparative example 2.
Figure 10:
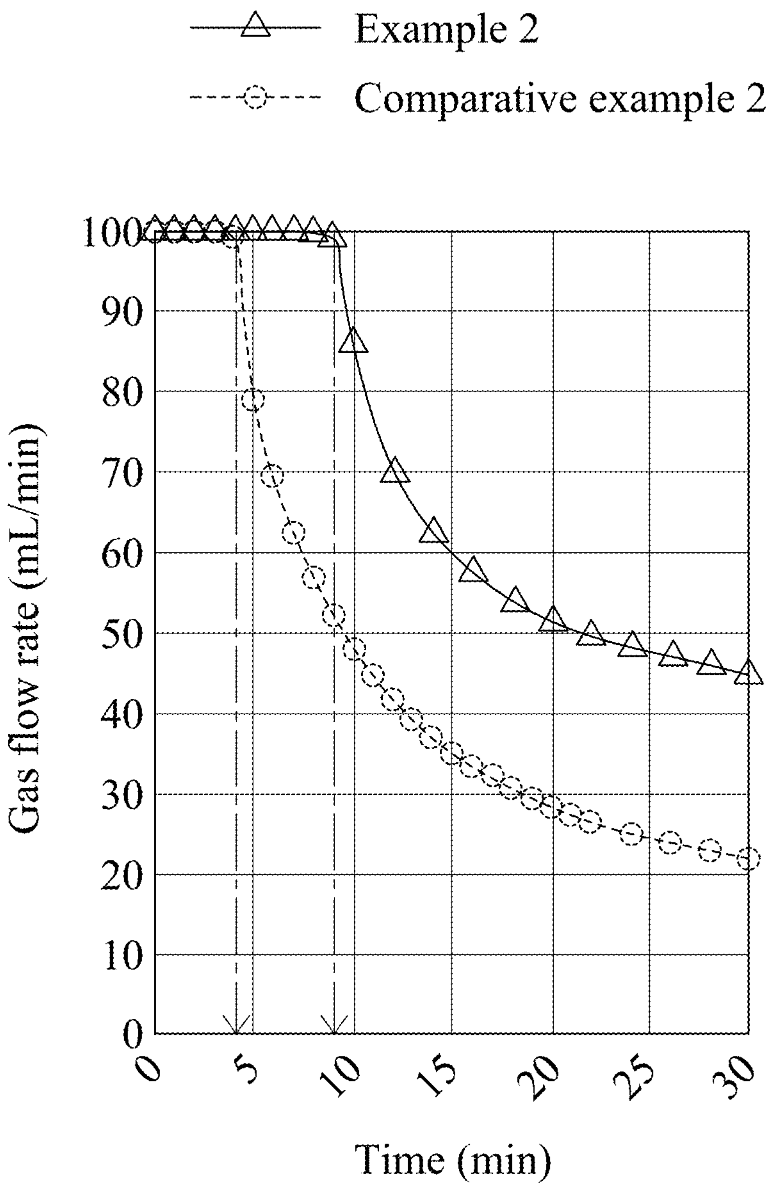
FIG. 10 shows the results of the gas-releasing test from 0 minutes to 30 minutes of FIG. 9.

Reference is made to FIG. 9 and FIG. 10. FIG. 9 shows the results of the gas-releasing test of the gas storage structure of Example 2 and the gas storage structure of Comparative example 2, wherein the gas storage structure of Example 2 is the gas storage structure of FIG. 6A, so that the details of the same elements are not described herein. FIG. 10 shows the results of the gas-releasing test from 0 minutes to 30 minutes of FIG. 9. Particularly, in the present experiment, the target gas is also the hydrogen, and Example 2 is the gas storage structure of the present disclosure. Further, Comparative example 2 is a commercial gas storage structure with the fractal network distribution of the pores, which is different from the gas storage structure of the present disclosure with the radial distribution of the pores.

As shown in FIG. 9, the gas flow rate of the gas storage structure of Example 2 is higher than that of the gas storage structure of Comparative example 2. As shown in FIG. 10, when the gas flow rate is fixed at a high flow rate, which is fixed at 100 milliliters per minute (as indicated by the arrow), the gas-releasing time of Example 2 is longer than that of Comparative example 2. Further, the gas-releasing time of Example 2 can be more than 2 times compared to the gas-releasing time of Comparative example 2.

According to the aforementioned embodiments, the gas storage structure and the gas storage device of the present disclosure have the following advantages.

First, due to the arrangements that the gas storage structure includes at least one tubular element, the tubular element includes at least two gas storage layers, and the plurality of pores of the gas storage layers are radially distributed from the channel of the tubular element to a peripheral area thereof, it is advantageous for increasing the specific surface area of the gas storage structure and guiding the flow direction of a gas in the gas storage structure. Therefore, the mass transfer resistance of the gas can be reduced, the efficiency of storing the gas or releasing the gas from the crystallites can be effectively enhanced, and the time for filling the gas storage structure with the gas can be reduced.

Second, by the arrangement that the densities of the at least two gas storage layers are different, the crystallites are more stable during thermal changes and volume changes caused by storing gas and releasing gas, and the lifetime of the gas storage structure can be increased.

Third, better strength and toughness of the gas storage structure can be provided by elastically adjusting the particle size of each of the crystallites from 0.5 μm to 100 μm.

Fourth, the gas storage structure of the present disclosure can be manufactured using different materials or a combination thereof so as to meet different gas storage requirements, and an excellent gas-releasing effect can be achieved.

Therefore, the gas storage structure and the gas storage device of the present disclosure have potential applications in relevant markets.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A gas storage structure, comprising:
at least one tubular element, comprising:
at least one channel; and
at least two gas storage layers surrounding the at least one channel, wherein each of the at least two gas storage layers comprises a plurality of pores, the at least two gas storage layers have different numbers of the plurality of pores per unit volume thereof, and sizes of the plurality of pores are different;
wherein each of the at least two gas storage layers comprises a plurality of crystallites, the plurality of pores are formed by the plurality of crystallites connected there among, and the plurality of pores are radially distributed from the at least one channel of the at least one tubular element to a peripheral area thereof.

2. The gas storage structure of claim 1, wherein each of the sizes of the plurality of pores is 0.1 μm to 500 μm.

3. The gas storage structure of claim 1, wherein the at least two gas storage layers comprise a first gas storage layer and a second gas storage layer, and the first gas storage layer and the second gas storage layer are sequentially connected and concentrically disposed from the at least one channel of the at least one tubular element to the peripheral area thereof;
wherein a density of the first gas storage layer is smaller than or greater than a density of the second gas storage layer.

4. The gas storage structure of claim 3, wherein when the density of the first gas storage layer is smaller than the density of the second gas storage layer, an average of the sizes of the plurality of pores of the first gas storage layer is 100 μm to 200 μm, and an average of the sizes of the plurality of pores of the second gas storage layer is 0.1 μm to 100 μm.

5. The gas storage structure of claim 1, wherein a particle size of each of the plurality of crystallites is 0.5 μm to 100 μm.

6. The gas storage structure of claim 1, wherein a material of each of the plurality of crystallites comprises a carbon group material, a boron group material, a nitrogen group material, a zeolite material, a metal-organic framework material, a metal oxide material, a silica gel, an aerogel, a lithium molecular sieve, a covalent organic framework material, a bentonite or a sepiolite.

7. The gas storage structure of claim 1, wherein a material of each of the plurality of crystallites is selected from a group consisting of an AB alloy, an $AB_2$ alloy, an $AB_3$ alloy, an $AB_5$ alloy, an $A_2B$ alloy, an $A_2B_7$ alloy, an $A_6B_{23}$ alloy, a solid solution and a magnesium-based alloy, wherein A is an exothermic metal, and B is an endothermic metal.

8. The gas storage structure of claim 1, wherein a material of each of the plurality of crystallites is selected from a group consisting of a silver, a copper, a carbon, a titanium, a nickel, an iron, a cobalt, a vanadium, a platinum, a palladium, a chromium, a gold, a lanthanum and a cerium.

9. The gas storage structure of claim 1, wherein a gas filling time of the gas storage structure is reduced by at least 20% compared to a gas filling time of a commercial granular hydrogen storage structure or a gas filling time of a commercial tablet-shaped hydrogen storage structure.

10. The gas storage structure of claim 1, wherein a gas-releasing rate of the gas storage structure is greater than or equal to 56%.

11. A gas storage device, comprising:
a main body comprising a gas port and an accommodating space, wherein the gas port is communicated with the accommodating space;
the gas storage structure of claim 1 disposed in the accommodating space; and an air valve element disposed on the main body and communicated with the gas port, and the air valve element communicated with the accommodating space and an external space of the main body;

wherein a maximum diameter of the gas port is parallel to a maximum diameter of the at least one tubular element;

wherein when the air valve element is opened, the at least one channel of the gas storage structure is communicated with the external space of the main body, and a gas is stored in or released from the gas storage device.

12. The gas storage device of claim 11, wherein the main body further comprises:

a gas guiding structure disposed in the accommodating space, wherein the gas guiding structure is disposed between the air valve element and the gas storage structure, the gas guiding structure comprises a plurality of gas guiding holes, and a maximum diameter of each of the plurality of gas guiding holes is parallel to the maximum diameter of the at least one tubular element;

wherein the gas guiding structure is for controlling an inflation speed or a deflation speed of the gas storage device.

* * * * *